Sept. 14, 1926.
T. L. KNAPP
1,600,005
RIBBON MECHANISM FOR TYPEWRITING MACHINES
Filed April 14, 1923    3 Sheets-Sheet 1
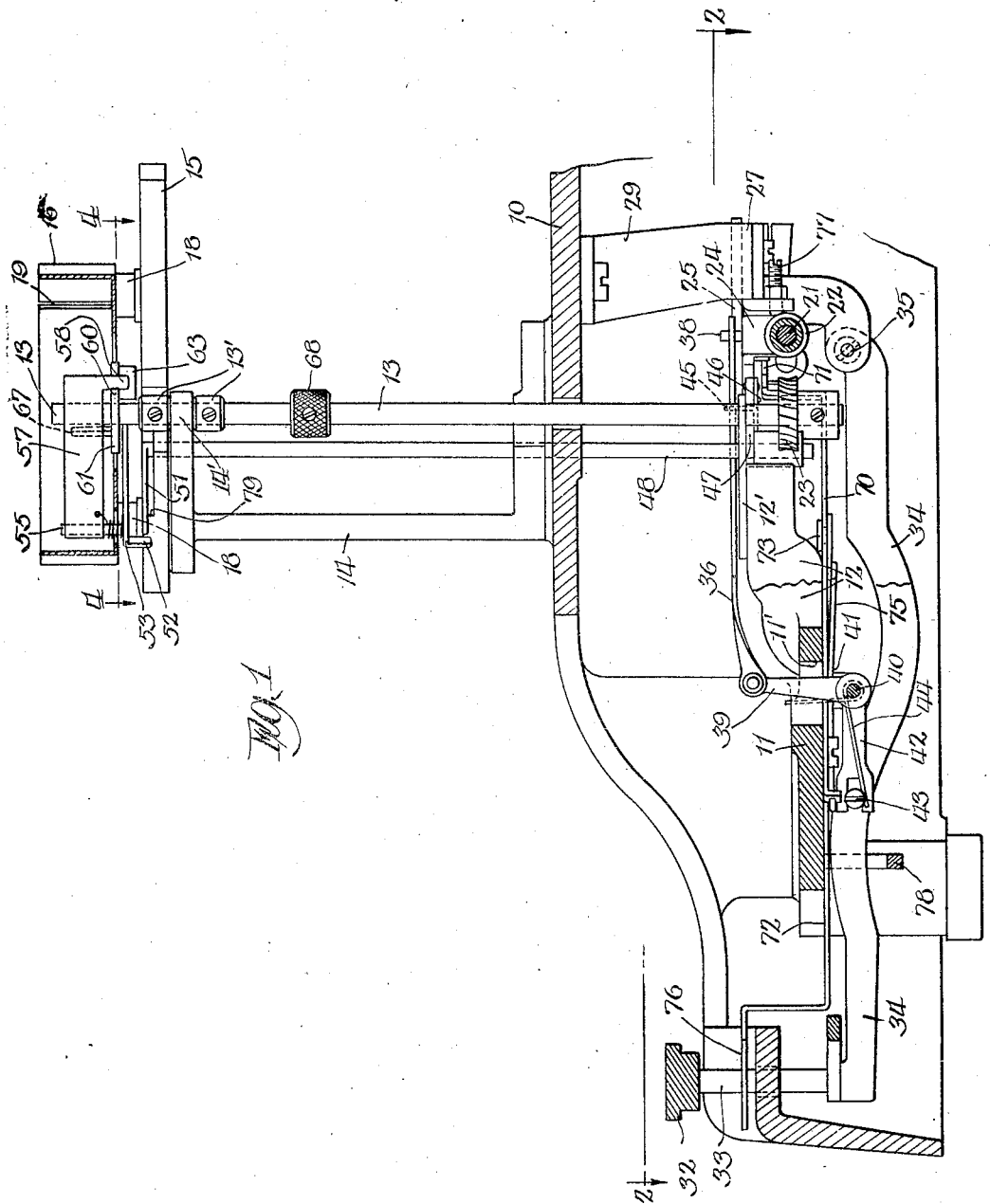
Inventor:
Theron L. Knapp.
by Fisher, Towle, Clapp & Soans
Atty's

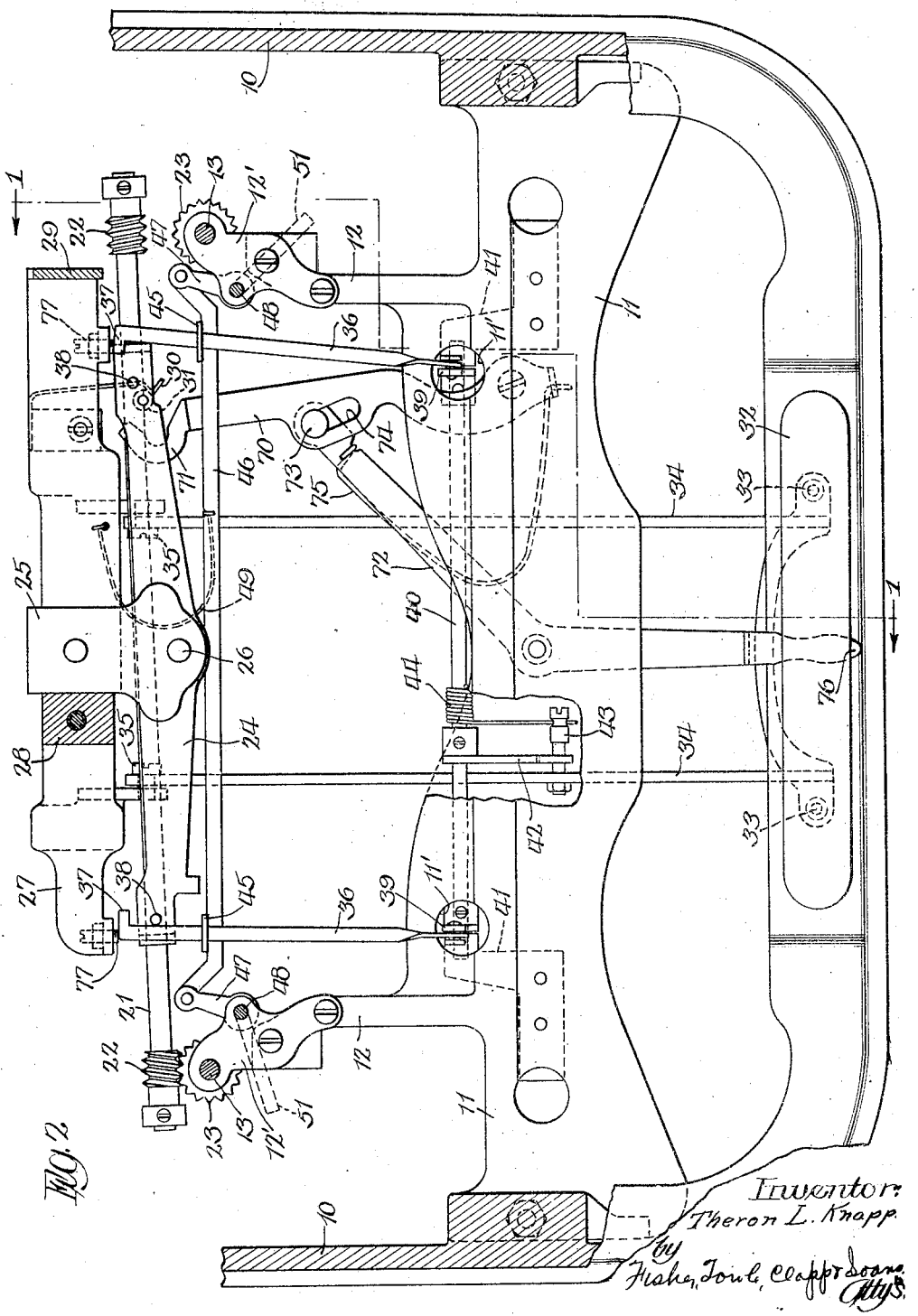

Sept. 14, 1926.
T. L. KNAPP
1,600,005
RIBBON MECHANISM FOR TYPEWRITING MACHINES
Filed April 14, 1923    3 Sheets-Sheet 3
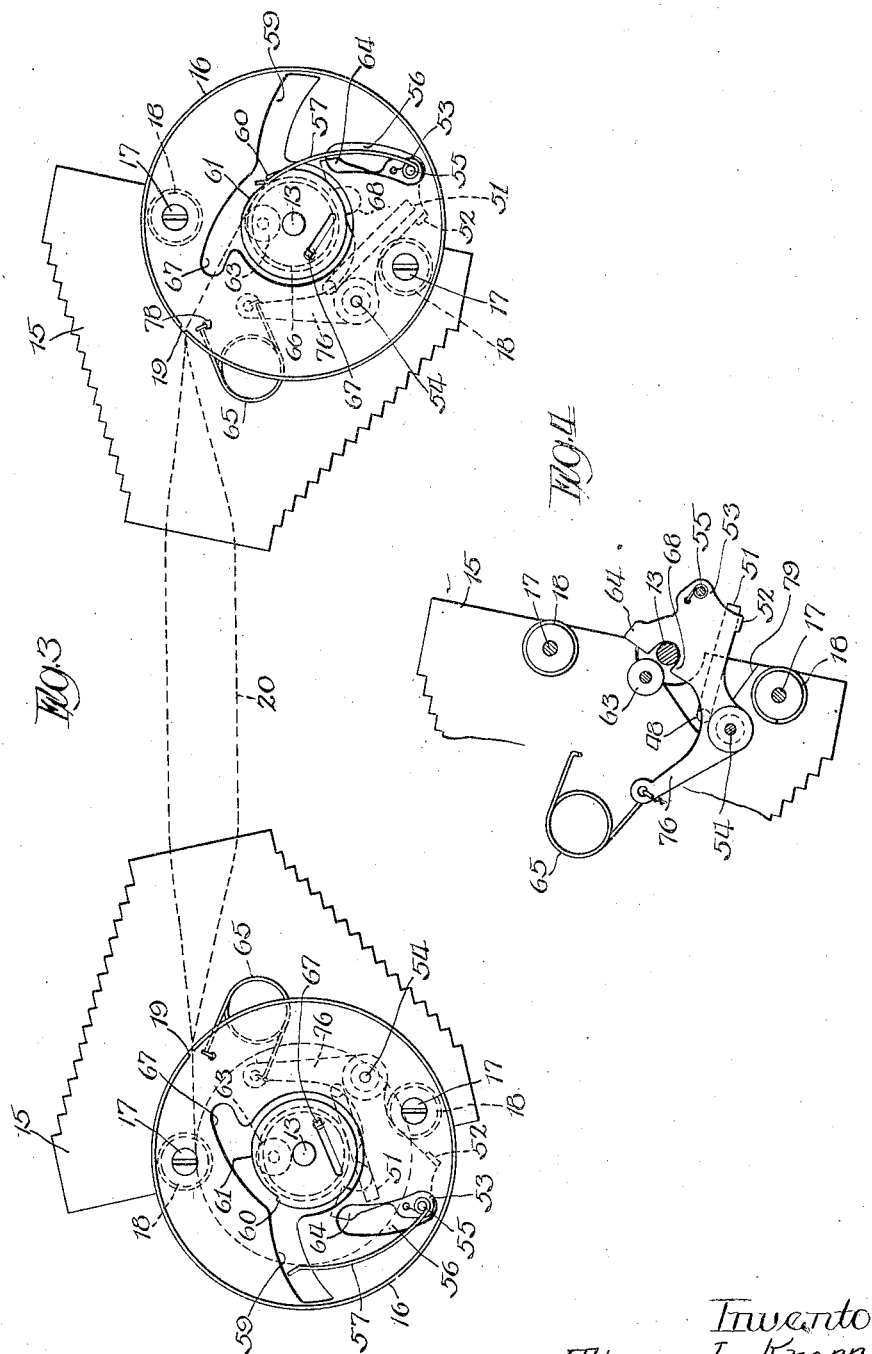
Inventor:
Theron L. Knapp.
by Fisher, Soule, Clapp & Soans
Atty's.

Patented Sept. 14, 1926.

1,600,005

UNITED STATES PATENT OFFICE.

THERON L. KNAPP, OF WOODSTOCK, ILLINOIS, ASSIGNOR TO THE OLIVER TYPEWRITER COMPANY, OF CHICAGO, ILLINOIS, A CORPORATION OF ILLINOIS.

RIBBON MECHANISM FOR TYPEWRITING MACHINES.

Application filed April 14, 1923. Serial No. 631,962.

The present invention relates to ribbon mechanism for typewriting machines and the like and seeks to provide improved means for effecting the automatic reversal of the movement of the ribbon. More particularly the improvement seeks to provide ribbon reversing mechanism which, while controlled by the movement of the ribbon, will not place excessive strain thereon, and in which the movements required for reversing the ribbon feed are effected quickly and with certainty. The invention consists in the features of improvement hereinafter set forth, illustrated in the preferred form in the accompanying drawings and more particularly pointed out in the appended claims.

The present invention is particularly applicable to and is shown in connection with the ribbon mechanism of the well-known "Oliver" typewriter and shown in the prior T. L. Knapp Patents No. 903,823, dated November 10, 1908, and No. 1,115,684, dated November 3, 1914.

In the drawings:

Fig. 1 is a view partially in elevation and partially in section on the line 1—1 of Fig. 2 of the improved mechanism;

Fig. 2 is a horizontal section on the line 2—2 of Fig. 1;

Fig. 3 is a plan of the parts at the upper ends of the ribbon spool shafts, and

Fig. 4 is a horizontal section on the line 4—4 of Fig. 1.

The forward portion of the base frame 10 of the machine is provided with a transverse bar 11 and the latter has two rearwardly projecting integral arms or brackets 12. The lower ends of a pair of vertical spool shafts 13 are journaled in plates 12' fixed to the arms 12. The upper ends of the spool shafts are journaled in the lateral projections 14' on the upper ends of two standards 14 fixed on the base frame 10 and which carry the type bar supporting brackets 15. The shafts 13 are held against vertical movement by collars 13' fixed thereto above and below the projections 14'. The extreme upper ends of the shafts, which carry the ribbon spools, are arranged within a pair of fixed sheet metal cups 16 secured to the brackets 15 by screws 17 and spaced therefrom by collars 18, and these cups are provided with vertical guiding slots 19 for the ribbon 20.

One or the other spool shafts is rotated to feed the ribbon by a horizontal drive shaft 21 having worms 22 on its ends that are arranged to engage worm wheels 23 fixed to the lower ends of the spool shafts. The drive shaft 21 is journaled in the downturned ends of a sheet metal support or carrier 24 and the latter is centrally connected to a fixed support 25 by a pivot pin 26, the arrangement being such that the support or carrier 24 and drive shaft 21 can be oscillated in opposite directions about the pivot 26 to engage one pair of worm gears and disengage the other. The support 25 is fixed to a transverse bar 27 which is secured at one point to a lug 28 projecting downwardly from the top of the base frame and one end of the bar has an upturned portion 29 fixed to the base frame. A leaf spring 30, fixed to and projecting forwardly from the bar 27, has a V-shaped forward end which cooperates with a pin or roller 31 on the shaft carrier 24 and yieldingly holds the ribbon drive shaft in operative relation with either one of the ribbon spool shafts. The V-shaped end of the spring 30 also cooperates with the roller 31 to complete the movement of the drive shaft 21 when the latter is shifted to reverse the ribbon feed.

The parts thus far referred to are similar to those shown in the Knapp patents above noted and the shaft 21 is preferably driven as set forth in Patent No. 903,823, that is to say, by means of a ratchet wheel centrally fixed to the shaft and engaged by pawls actuated from the universal bar.

The present improvement provides means for shifting the shaft 21 to automatically reverse the ribbon feed and comprises an actuator and coupling means controlled by the movement of the ribbon for connecting the actuator to the drive shaft support and so arranged that the latter may be shifted in opposite directions.

The actuator for reversing the ribbon drive mechanism is preferably the usual space key 32 mounted at the forward part of the machine frame upon the upper ends of a pair of pins 33 which are fixed to the forward connected ends of a pair of key levers 34, the rear ends of which are connected by pivot screws 35 to depending lugs on the transverse bar 27. The coupling means between the space key and the drive shaft carrier comprises a pair of connector rods 36 having inturned hooks 37 on their rear ends which are arranged to cooperate with pins 38 fixed to the ends of the shaft support or carrier 24. The forward ends of the connectors 36 are loosely pivoted to a pair of crank arms 39 fixed to a rock shaft 40 and projecting upwardly therefrom through openings 11' in the frame bar 11. The shaft 40 is journaled in a pair of brackets 41 fixed to the underside of the bar 11, has a horizontal arm 42 fixed thereto and the slotted forward end of this arm engages a pin 43 fixed to one of the key levers 34. A spring 44 coiled about the shaft has its extended ends in engagement respectively with the pin 43 and with the rear edge of the frame bar 11 and serves to hold the space key and parts connected thereto in normal position.

The rear ends of the connector rods 36 extend through upturned lugs 45 on a transverse shifter bar 46 and the ends of the latter are pivotally connected to a pair of crank arms 47 on the lower ends of two vertical rock shafts 48. By moving the shifting bar 46 the connectors 36 can be moved back and forth between two different positions and in each of these positions the hooked rear end 37 of one of the connectors is in line with the corresponding pin 38, while the hook of the other connector and its pin are out of alinement. A bow-shaped spring 49 pivoted at its ends to the stationary bar 27 and to the shifter bar 46, is arranged to move past a dead center position as the latter is shifted and hold it and the connector rods 36 in either of these two positions. This spring also serves to quickly complete the movement of these parts in either direction.

The arms 47, as stated, are fixed to the lower ends of the small shafts 48 and the latter are journaled at their lower ends in the plates 12' and at their upper ends in the projecting portions 14' of the uprights 14. These shafts extend through the plates or brackets 15 and are provided with outwardly and forwardly extending crank arms 51. The latter are arranged to be engaged by offset and downturned lugs 52 on a pair of shifters or fingers 53 which are arranged beneath the ribbon cups 16 and are pivotally connected thereto intermediate their ends by pins 54. The outer or forward ends of the shifters or fingers 53 are provided with pins 55 which project upwardly through segmental slots 56 in the bottoms of the ribbon cups and carry spring-pressed followers 57, the rear ends of which are adapted to bear on the surface of the ribbon wound on the spools. Each follower is provided at its rear end with a depending lug 58 (see Fig. 1) which moves back and forth through a slot 59 (see Fig. 3) in the bottom of the associated ribbon cup as the ribbon is wound upon and unwound from the corresponding spool. When the ribbon is nearly unwound from either spool, the lug 58 on the associated follower is interposed in the path of movement of a shoulder or lug 60 on a disk 61 fixed to the adjacent spool shaft and the associated finger 53 is thereby moved from its normal position. Each disk 61 is provided on its under side with an eccentric pin or roller 63 and each shifter or finger 53 is provided with an offset portion 64 which is arranged to be engaged by the pin or roller 63 to restore the shifter to normal position. Each of the fingers 53 is held in normal position by a bow-shaped spring 65, the arms of which are pivotally connected respectively to the adjacent ribbon cup and to the inner end of the shifter or finger, and this spring is arranged to move across a dead center position to complete the movements of the finger in opposite directions and hold it either in its normal or in its shifted position.

The ribbon 20 and the hub-like spools 66 on which the ribbon is wound are shown in dotted lines in Fig. 3. These spools are mounted upon the upper ends of the spool shafts and engage upwardly projecting eccentric lugs 67 on the disks 61 so as to rotate with the shafts.

With the parts located as shown in Figs. 1, 2 and 3, the left-hand spool shaft is actuated by the drive shaft 21 and the ribbon is wound on the left-hand spool and unwound from the right-hand spool. Under such circumstances the shifter bar 46 and the connector rods 36 are in their right-hand position shown in Fig. 2 and the arms 51 on the upper ends of the shafts 48 are positioned as shown in dotted lines in Figs. 2 and 3. Both shifting fingers 53 are in normal position and in engagement with the collars 18. In this condition of affairs, the downturned lug 52 on the right-hand shifting finger 53 is slightly spaced from the associated crank arm 51. The different parts are held in the positions noted by springs 30, 49 and 65.

When the ribbon is nearly unwound from the right-hand spool, the lug 58 and the associated follower 57 will be interposed in the path of the lug 60 on the adjacent disk 61, so that the continued withdrawal of the ribbon from the right-hand spool will move the associated shifter or finger 53. During the initial portion of this movement the space or lost motion between the lug 52 on the finger and the crank arm 51 is taken up and when the spring 65 is moved slightly past its dead center position, it quickly completes the movement of the finger. This shift of the finger 53 and the lug 52 thereon oscillates the crank arm 51 and the right-hand rock shaft 48 in counter-clockwise direction. The movement of the right-hand rock shaft is of course communicated to the shifter bar 46 and to the left-hand rock shaft 48 and the connector rods 36 are moved transversely to the left, thus bringing the hooked rear end 37 of the right-hand connector rod into line with the associated pin 38 and throwing the hook 37 and pin 38 at the left-hand side of the machine out of alinement. The final portion of this movement of the rock shafts 48, the bar 46 and the connector rods 36 will be quickly completed by the spring 49 as soon as it is moved past its dead center position. Then when the space key is next depressed the right-hand connector rod 36 will reverse the position of the drive shaft 21 and the latter will then rotate the right-hand ribbon spool. In a similar manner the parts will be shifted back to the positions shown in the drawing when the ribbon is unwound from the left-hand ribbon spool.

The final withdrawal of the ribbon from the right-hand ribbon spool and the associated spring 65 cooperate, as described, to move the finger 53 from the position shown in Fig. 3 to that shown in Fig. 4, the initial movement effected by the ribbon taking up the lost motion between the finger 53 and the crank arm 51 and the final movement being quickly completed by the spring 65 and serving, as described, to change the coupling devices between the space key operated actuator and the reversible ribbon drive member. During this movement of the finger 53, the lug 58 on the end of the associated follower 57 is projected into a slot 67 in the bottom of the ribbon cup and the part 64 is shifted into a position adjacent the eccentric pin or roller 63, a notch 68 in the part 64 enabling it to clear the spool shaft 13. Then, upon the reversal of the direction of movement of the spool shafts, the roller 63 acts as a cam on the part 64 to restore the finger 53 to normal position, the final portion of the movement being completed by the spring 65 after its movement past dead center position. It is noted that the roller is sufficiently larger than the notch 68 to avoid catching therein.

It should be particularly noted that the construction is such that the strain on the ribbon required to effect the reversal is very slight. The final and operative portions of the movements of the shifting fingers 53 are effected by the springs 65 and these springs cooperate with the spring 49 to quickly reverse the position of the coupling devices between the key-operated actuator shaft 40 and the reversible ribbon drive shaft. It is also obvious that the tension on the followers which engage the portions of the ribbon wound on the spools can be very light. It is also noted that while the mechanism requires little tension on the ribbon, the movement of the parts and the reversal of the ribbon feed are effected quickly and with certainty.

It is sometimes desirable to free both spool shafts from the drive shaft so the operator can turn the spool shafts by means of finger pieces 69 mounted thereon, as for example, when inserting or removing a ribbon. For this purpose an arm or lever 70 is pivoted to the underside of the frame bar 11 and extends rearwardly therefrom. Its rear end is provided with an upwardly offset, hook-shaped portion 71 arranged between the shaft 21 and its supporting carrier 24 and adapted to cooperate with the roller 31 on the carrier. An operating arm or lever 72 pivoted to the underside of the frame bar 11 near its center is inclined laterally from its pivot toward the arm or lever 70 and a pin 73 on the end of the arm 72 engages a cam slot 74 in the central portion of the arm 70. A bow-spring 75 is connected to the rear end of the arm 72 and to the forward end of the arm 70 at a point in front of its pivot and the arm or lever 72 is provided with a forwardly extending portion having an upwardly offset finger piece 76. The spring 75 tends to hold the arms 70 and 72 in Fig. 2 of the positions shown in the drawings, with the pin 73 in the rear end of the slot 74. By shifting the finger piece 76 in left-hand direction, the hook 71 can be projected toward the roller 31. The hook 71 has oppositely inclined cam faces and a central seat for the roller so disposed that the engagement of the hook with the roller will serve to move the drive shaft 21 from either of its operative positions to an intermediate idle position. When the handle 76 is released, the spring 75 of course returns the arms 70 and 72 to the position shown in the drawings, and the drive shaft will be returned to one of its operating positions, either by the spring 30 or by the operation of the space key.

Preferably, as shown, adjustable stop screws 77 are provided on the frame bar 27 in position to engage the downturned ends of the shaft support 24 to limit the reversing shift of the ribbon drive shaft. A stop piece 78 depending from the frame bar 11 limits the movement of the space key levers 34 and the longitudinal movement of the coupling or connector rods 36 and the stop screw 77 is so adjusted that the hooks 37 of the connector rods 36 will not ordinarily engage the pins 38. The transverse movement of the connector rods and the shifter bar 46 is limited by the engagement of one or the other of the crank arms 51 with a shoulder 79 on the adjacent bracket 15 (see Fig. 1) and these limiting stops are preferably so arranged that the connector rods 36 do not rub on the pins 38 during the ordinary operation of the machine.

Obviously, changes may be made in the details set forth without departure from the essentials of the invention as defined in the claims.

I claim as my invention:

1. The combination with a ribbon drive mechanism including a member shiftable in opposite directions to reverse the same, of an actuator for shifting said member, coupling means for connecting said actuator and said member, quick-acting spring means operative to shift said coupling means in opposite directions to determine the direction of feed of the ribbon, and a pair of ribbon-actuated fingers for controlling the operations of said spring means.

2. The combination with a ribbon drive mechanism including a member shiftable to reverse the same, of an actuator for said member, shiftable coupling means for connecting said actuator and said member, a pair of normally stationary ribbon-actuated fingers having lost motion connections with said coupling means and spring means controlled by said fingers for completing the shift of said coupling means in opposite directions and for holding the same in either of two positions.

3. The combination with a ribbon drive mechanism including a member shiftable to reverse the same, of an actuator and adjustable coupling means between the same and said member for shifting the latter in opposite directions in accordance with the position of said coupling means, a pair of fingers having lost-motion connections with said coupling means and adapted to be initially shifted by the ribbon, and spring means placed under tension by the initial movement of said fingers for completing the throw of said fingers and effecting the adjustment of said coupling means.

4. The combination with a ribbon drive mechanism having a member shiftable in opposite directions to reverse the movement of the ribbon, of an actuator and a pair of adjustable coupling devices for shifting said member, quick-acting spring means for shifting said coupling devices in opposite directions and for holding the same in either of two positions, and a pair of ribbon-actuated fingers controlling the operation of said spring means.

5. The combination with a ribbon drive mechanism having a member shiftable in opposite directions to reverse the movement of the ribbon, of an actuator and a pair of adjustable coupling devices for shifting said member, a pair of shifters having lost-motion connections with said coupling devices and adapted to be initially shifted by the ribbon to take up such lost motion, and spring means controlled by the movement of said shifters for completing the movements of said coupling means in opposite directions.

6. In a typewriter, the combination with a ribbon drive mechanism having a member shiftable in opposite directions to reverse the same, of a quick-operated reversing actuator, coupling means between said actuator and said member adjustable to either one of two positions, a pair of normally stationary ribbon-controlled shifters having lost-motion connections with said coupling means for adjusting the same, and spring means for completing the adjustment of said coupling means.

7. In a typewriter, the combination with a ribbon drive mechanism having a member shiftable in opposite directions to reverse the same, of a quick-operated reversing actuator, a pair of coupling devices for operatively connecting said actuator and said member, a pair of shifters having lost-motion connections with said coupling devices for alternately throwing the same into and out of operative positions, and spring means placed under tension by said shifters for completing the throw in opposite directions of said coupling devices and for holding the same in adjusted position.

8. In a typewriter, the combination with a pair of ribbon spool shafts and a drive mechanism therefor having a member shiftable in opposite directions to reverse the ribbon, of an actuator for said reversible member, means for coupling said actuator and said member, quick-acting spring means for shifting said coupling means alternately in opposite directions to determine the direction of movement of the ribbon, and a pair of shifters controlled by the ribbon and actuated by said spool shafts for controlling the operation of said spring means.

9. In a typewriter, the combination with a pair of ribbon spool shafts and a drive mechanism therefor having a member shiftable in opposite directions to reverse the ribbon, a pair of normally stationary shifters controlled by the ribbon and actuated by said spool shafts, said shifters having lost-motion connections with said coupling means for shifting the same in opposite directions, and spring means placed under tension by said shifters for completing the throw in opposite directions of said coupling means and for holding the same in adjusted position.

10. In a typewriter, the combination with a pair of shafts, ribbon spools thereon and a drive mechanism for the shafts having a member shiftable in opposite directions to reverse the ribbon, of an actuator for said reversible member, two coupling devices for connecting said actuator and said member, said coupling devices being connected together and alternately shiftable one into and the other out of operative position, a pair of independently movable, normally stationary shifters having one-way connections with said coupling devices for shifting the same, followers on said shifters for engaging the ribbon on said spools, and a lug fixed to each of said shafts and arranged to engage the associated follower, when the ribbon is unwound from the spool thereon, to thereby operate the corresponding shifter.

11. In a typewriter, the combination with a pair of ribbon spool shafts and a drive mechanism therefor having a member shiftable in opposite directions to reverse the ribbon, of an actuator for said reversible member, means for coupling said actuator and said member, a pair of independently movable normally stationary shifters controlled by the ribbon and actuated by said spool shafts, said shifters having one-way connection with said coupling means for initially moving the same in opposite directions, and spring means for completing the shift in opposite direction of said coupling means and for holding the same in either one of two adjusted positions.

12. In a typewriter, the combination with a pair of ribbon spool shafts and a reversible drive member therefor, of a reversing actuator operated by the typewriter space-key, a pair of coupling devices for connecting said actuator and said drive member, shifter means connecting said coupling devices for alternately throwing the same into and out of operative position, and a pair of independently movable fingers controlled by the ribbon and each operated by one of said spool shafts for actuating said shifter means.

13. In a typewriter, the combination with a pair of ribbon spool shafts and a reversible drive member therefor, of a reversing actuator operated by the typewriter space-key, a pair of coupling devices for connecting said actuator and said drive member, shifter means connecting said coupling devices for alternately throwing the one of said coupling devices into and the other out of operative position, a pair of independently movable, ribbon-controlled shifters having one-way connections with said shifter means for initially moving the same, spring means for completing the movement in opposite directions of said shifter means and said coupling devices and for holding the same in adjusted position.

14. In a typewriter, the combination with a pair of ribbon spool shafts and a reversible drive member therefor, of a reversing actuator operated by the typewriter space-key, a pair of coupling devices for connecting said actuator and said drive member, shifter means connecting said coupling devices for alternately throwing the same into and out of operative position, a pair of independently movable fingers controlled by the ribbon and each shifted in opposite directions by one of said spool shafts, said fingers having lost motion connections with said shifter means for adjusting the same, and springs tensioned by the initial movements of said fingers and said shifter means respectively for completing the movements thereof and for holding the same in their adjusted positions.

15. In a typewriter, the combination with a pair of ribbon spool shafts and a reversible drive member therefor, of a reversing actuator operated by the typewriter space-key, a pair of coupling devices for connecting said actuator and said drive member, shifter means connecting said coupling devices for alternately throwing the same into and out of operative position, a pair of independently movable fingers having lost-motion connections with said shifter means for operating the same, followers connected to said fingers and moved by the ribbon to and from said spool shafts, the latter having means for engaging said followers and moving said fingers in opposite directions, and springs adapted to be tensioned by the initial movements of said fingers and said shifter means respectively for completing the movements thereof and for holding the same in their adjusted positions.

16. In combination in a ribbon mechanism, a pair of spool shafts, drive mechanism therefor, a pair of independently movable, normally stationary, ribbon-controlled shifters, each of said spool shafts having parts operative upon the final and initial winding movements thereof for moving one of said shifters in opposite directions, spring means for completing the movements of the shifters in opposite directions and means controlled by said shifters for reversing said drive mechanism.

17. In combination in a ribbon mechanism, a pair of spool shafts, drive mechanism therefor, a pair of independently movable, ribbon-controlled shifters, each of said spool shafts having means operative upon the final and initial winding movements therefor for moving one of said shifters in opposite directions, springs tensioned by the initial movements of said shifters for completing such movements, and means controlled by said shifters for reversing said drive mechanism.

18. In combination in a ribbon mechanism, a pair of spool shafts, drive mechanism therefor, a pair of independently movable, ribbon-controlled shifters, each of said spool shafts having means operative upon the final and initial winding movements thereof for moving one of said shifters in opposite directions, springs tensioned by the initial movements of said shifters for completing such movements; and means having lost-motion connections with said shifters and actuated thereby for controlling the reversal of said drive mechanism.

19. In a typewriter ribbon mechanism, the combination with a pair of spool shafts, reversible drive mechanism therefor, a pair of independently movable, pivoted fingers, followers connected to said fingers and moved by the ribbon to and from said shafts respectively, each of said shafts having parts arranged to engage one of said followers and move the corresponding finger in opposite directions, springs tensioned by the initial movements of said fingers for completing such movements, and means controlled by said fingers for reversing said drive mechanism.

20. In a typewriter ribbon mechanism, the combination with a pair of spool shafts, reversible drive mechanism therefor, a pair of independently movable, pivoted fingers, followers connected to said fingers and moved by the ribbon to and from said shafts respectively, each of said shafts having means arranged to engage one of said followers and move the corresponding finger in opposite directions, springs tensioned by the initial movements of said fingers for completing such movements, and shifter means having lost motion connections with said fingers and moved in opposite directions thereby for controlling the reversal of said drive mechanism.

21. In a typewriter ribbon mechanism, the combination with a pair of spool shafts and a drive shaft shiftable into operative relation with either one of said shafts, a space-key operated actuator, coupling bars between said actuator and said shaft for moving the latter in opposite directions, a shifter bar connecting said coupling bars for alternately throwing one of said coupling bars into and the other out of operative position, a spring tensioned by the initial movements of said bars for completing the movements in opposite directions thereof and for holding the same in adjusted position, and a pair of ribbon-controlled fingers for effecting the initial movements of said bars.

22. In a typewriter ribbon mechanism, the combination with a pair of spool shafts and a drive shaft shiftable into operative relation with either one of said shafts, a space-key operated actuator, coupling bars between said actuator and said shaft for moving the latter in opposite directions, a shifter bar connecting said coupling bars for alternately throwing the same into and out of operative position, a spring tensioned by the initial movements of said bars for completing such movements and for holding the same in adjusted position, and a pair of independently movable, ribbon-controlled fingers having one-way connections with said bars for effecting the initial movements thereof.

23. In a typewriter ribbon mechanism, the combination with a pair of spool shafts, a drive shaft shiftable into operative relation with one or the other of said spool shafts, and spring means for yieldingly holding said shaft in either operative position, of means for moving said shaft from either operative position to an intermediate idle position, comprising cooperating cam members, one connected to said shaft, and a pair of pivoted levers having a pin-and-slot connection for operating the other cam member.

24. In a typewriter ribbon mechanism, the combination with a pair of spool shafts, a drive shaft shiftable into operative relation with one or the other of said spool shafts, and spring means for yieldingly holding said shaft in either operative position, of means for moving said shaft from either operative position to an intermediate idle position, comprising cooperating cam members, one connected to said shaft, a pair of pivoted levers having a pin-and-slot connection, the other cam member being fixed to one of said levers and the other lever having a finger piece, and a spring connected to said levers for holding the same in normal position.

THERON L. KNAPP.